Figure 1:
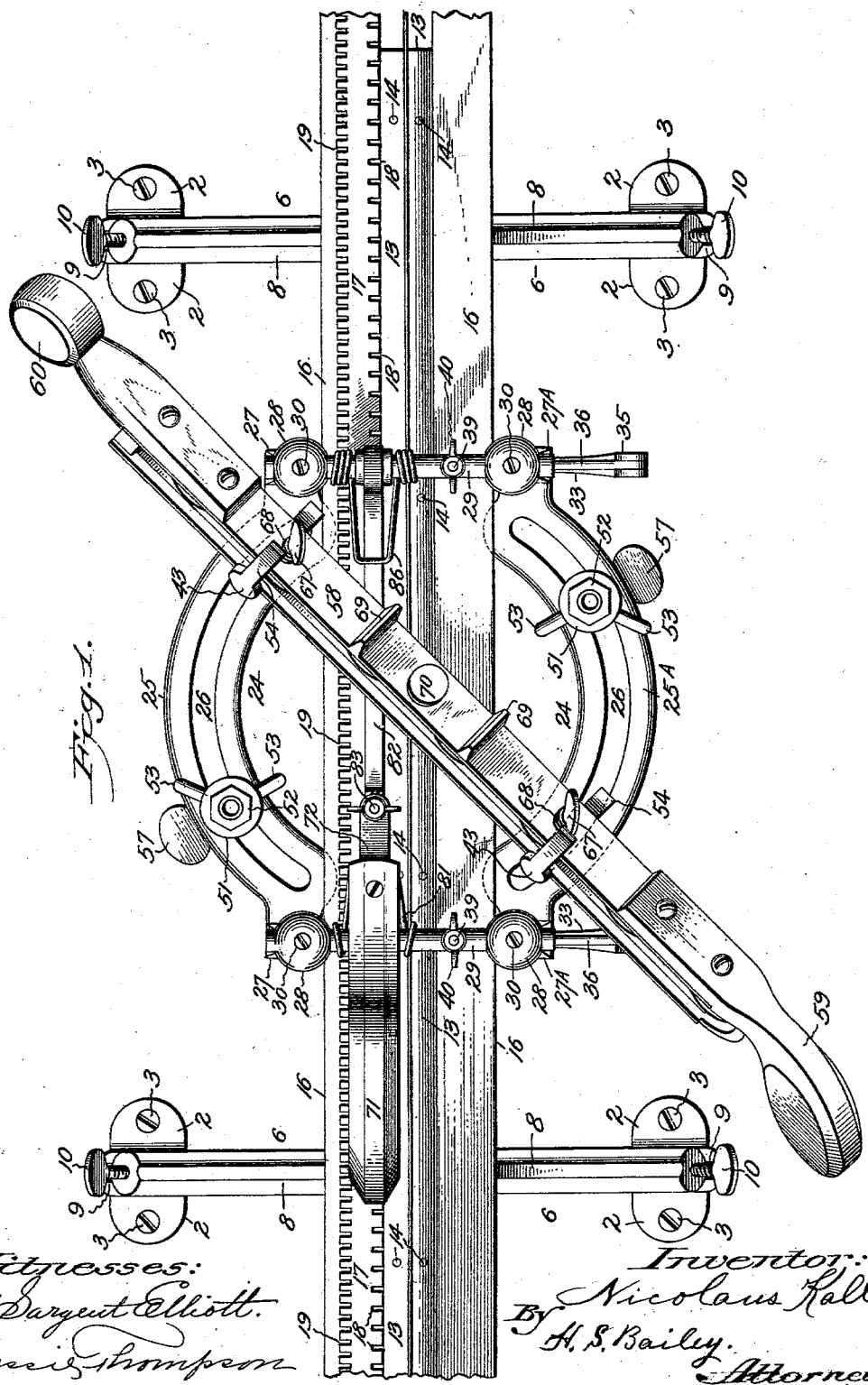

No. 757,663. PATENTED APR. 19, 1904.
N. KALL.
SAW FILING MACHINE.
APPLICATION FILED JULY 28, 1903.
NO MODEL. 4 SHEETS—SHEET 1.

Witnesses: Inventor:
G. Sargent Elliott. Nicolaus Kall
Bessie Thompson. By H. S. Bailey.
Attorney.

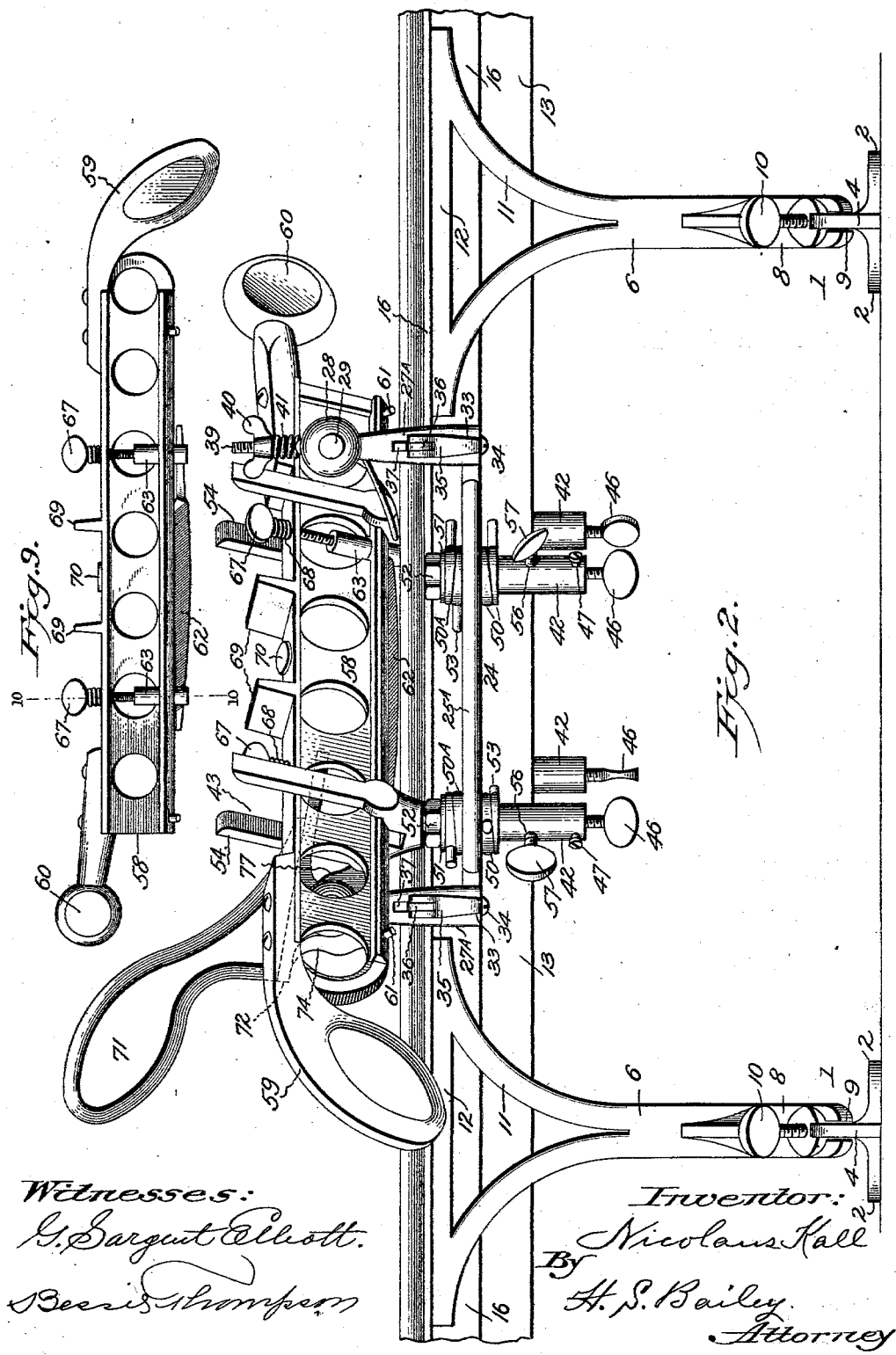

No. 757,663. PATENTED APR. 19, 1904.
N. KALL.
SAW FILING MACHINE.
APPLICATION FILED JULY 28, 1903.
NO MODEL. 4 SHEETS—SHEET 3.
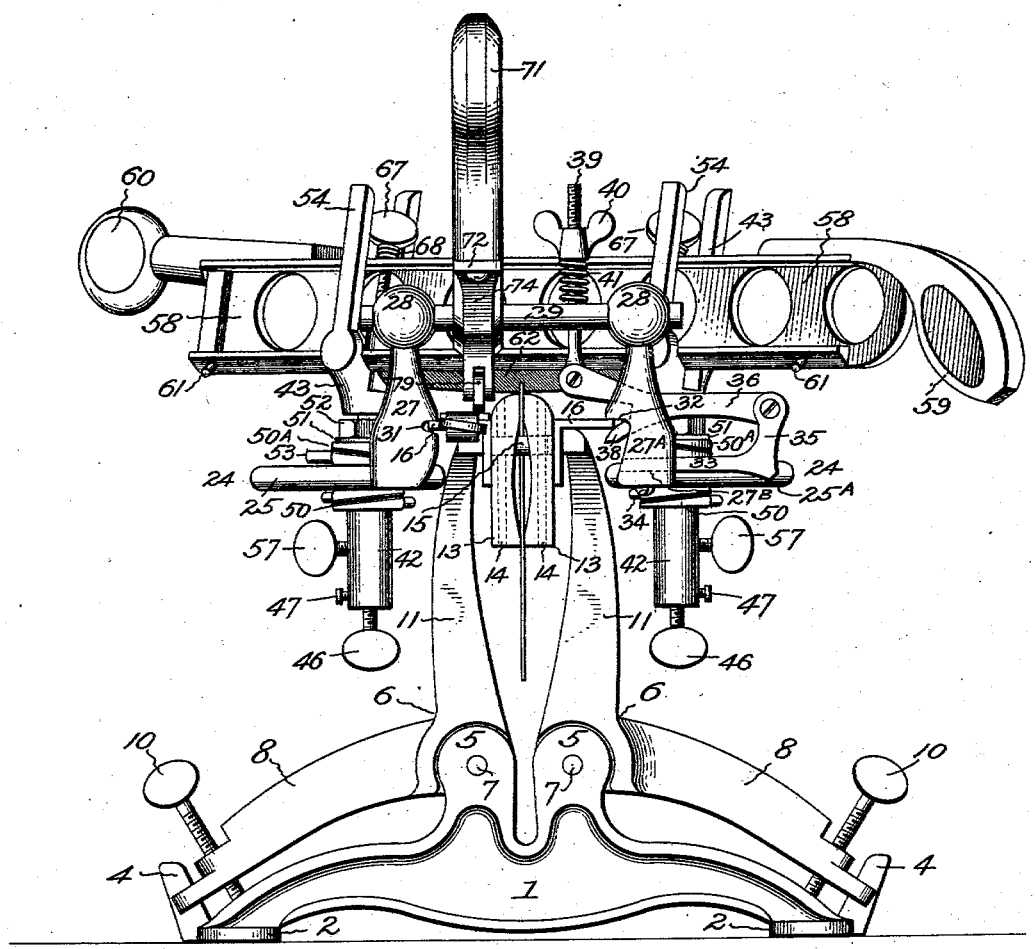
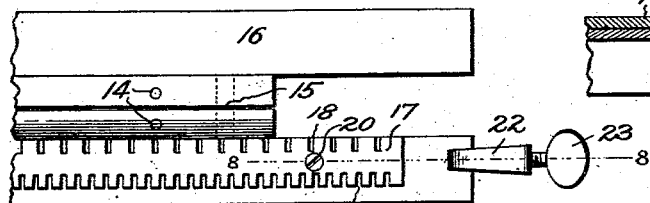
Witnesses:
G. Sargent Elliott.
Bessie Simpson
Inventor:
Nicolaus Kall.
By
H. S. Bailey
Attorney No. 757,663. PATENTED APR. 19, 1904.
N. KALL.
SAW FILING MACHINE.
APPLICATION FILED JULY 28, 1903.
NO MODEL. 4 SHEETS—SHEET 4.
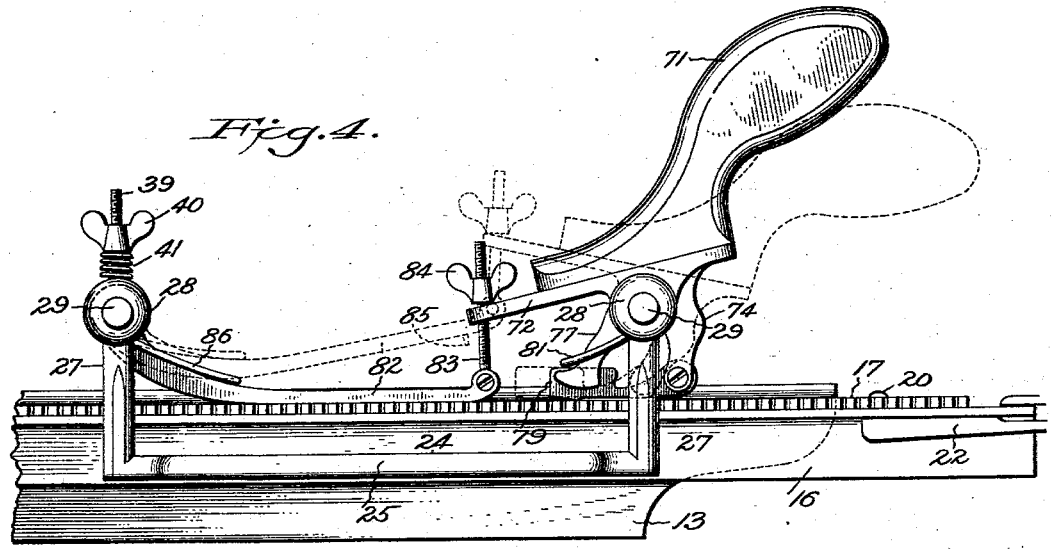
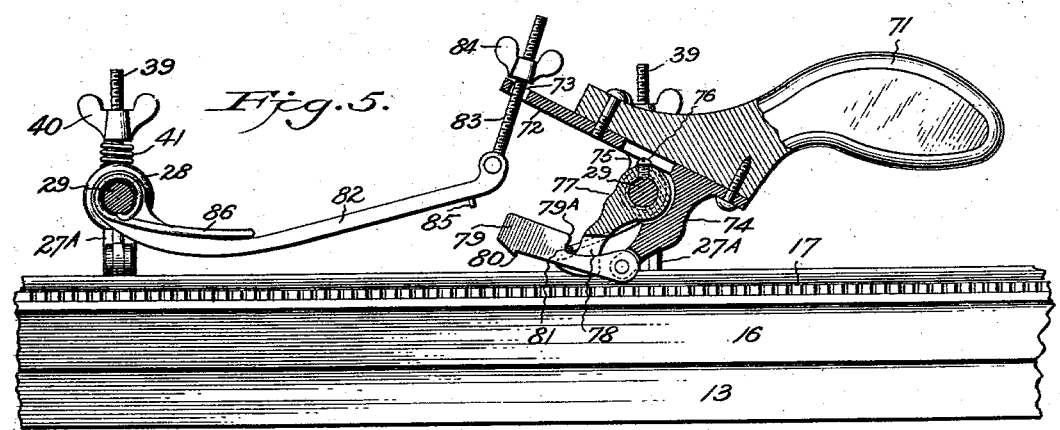
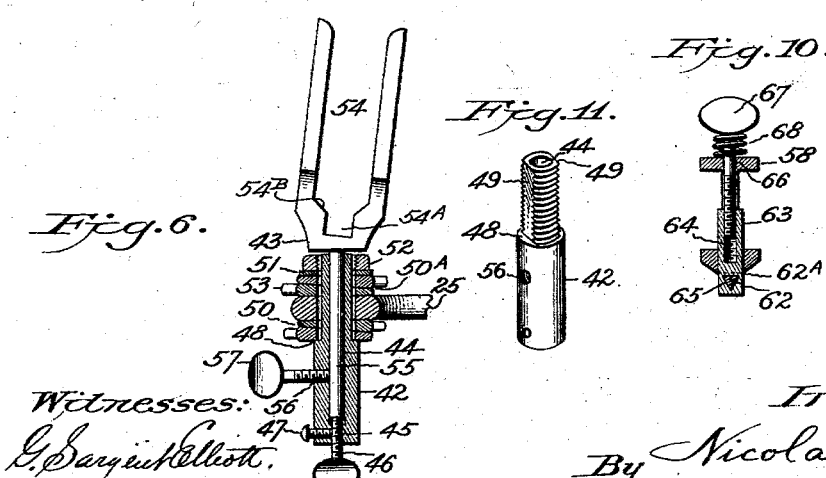

No. 757,663.

Patented April 19, 1904.

UNITED STATES PATENT OFFICE.

NICOLAUS KALL, OF DENVER, COLORADO.

SAW-FILING MACHINE.

SPECIFICATION forming part of Letters Patent No. 757,663, dated April 19, 1904.

Application filed July 28, 1903. Serial No. 167,301. (No model.)

*To all whom it may concern:*

Be it known that I, NICOLAUS KALL, a citizen of the United States of America, residing in the city and county of Denver and State of Colorado, have invented certain new and useful Improvements in Saw-Filing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in saw-filing machines.

The object of the invention is to provide a suitable clamping-frame for the saw, upon which a carriage is designed to be moved step by step from one end to the other, the said carriage being provided with adjustable guides in which a file-holder is designed to be reciprocated; also, to provide for varying the distance which the carriage is to be moved at each step, so that the machine may be adapted for filing both coarse and fine saws.

A further object of the invention is to provide for reciprocating the file-holder at any desired horizontal angle with respect to the saw, so that both "crosscut" and "rip" saws may be filed, and also for tilting the file-holder vertically, so that the file may conform to the angle upon which the teeth of the saw are formed, means being provided for automatically lifting the file out of engagement with a tooth at each step-by-step movement of the file-holder carriage and for limiting the downward movement of the file, so that all the teeth may be of uniform depth throughout the length of the saw.

The invention further consists of an improved manner of securing the file to the holder, of vertically adjusting the file-holder guide, and also in certain novel features of construction, all of which are fully illustrated in the accompanying drawings, in which—

Figure 1 is a plan view of my improved saw-filing machine, the file-holder being arranged for filing a crosscut-saw, a portion of each end of the machine being omitted. Fig. 2 is a side elevation of Fig. 1. Fig. 3 is an end elevation of the same looking from the rear. Fig. 4 is a side view taken from the opposite side of the machine, showing the mechanism for moving the file-holder carriage in full lines in its normal position and in dotted lines in a different position, the file-holder and guides therefor being omitted. Fig. 5 is a similar view, partly in section, showing the carriage-moving mechanism in position for permitting the carriage to be slid backward upon the clamping-frame. Fig. 6 is a fragmentary sectional view showing one of the file-holder guides, the adjustable socket in which it is secured, a portion of the carriage to which the socket is secured, and the adjusting means for socket and guide. Fig. 7 is a view of one of the ends of the machine, showing the manner of adjusting the notched spacer by which the distance of each step-by-step movement of the carriage is determined, the opposite end of the machine being identical in construction. Fig. 8 is a vertical longitudinal sectional view taken on the dotted line 8 8 of Fig. 7. Fig. 9 is a side elevation of the file-holder. Fig. 10 is a vertical section through the same on the dotted line 10 10, and Fig. 11 is a perspective view of the socket in which the file-holder guide is secured.

Referring to the accompanying drawings, the numeral 1 indicates each of a pair of standards which are secured a suitable distance apart to a fixed support, such as a bench. The standards are provided at each side with a pair of ears 2, in which are holes through which bolts or screws 3 are passed for securing the standards to the support, and extending centrally and vertically from the outside edge of each pair of ears is an integral guide-lug 4, the object of which will presently be shown. The standards are also provided centrally and on their upper edges with a pair of bearings 5, which are formed side by side and are each bifurcated in the direction of the length of the standard, and in each bifurcated bearing is pivoted a clamp-arm 6, as will be clearly seen by reference to Fig. 3, pivot-pins 7 serving to support them. The clamp-arms are each substantially bell-crank shaped in side elevation, and their lateral members 8 extend out to the ends of the standards and are bifurcated, as shown at 9, so as to straddle the vertical guide-lugs 4, and adjacent to their bifurcated ends threaded holes are formed in which thumb-screws 10 are screwed, said screws being designed to pass through the threaded hole and to contact with the upper edge of the standard. The vertical members 11 of the clamp-arms are each of the form shown most clearly in Fig. 2, in which a horizontal clamping portion 12 of suitable length is illustrated, and between the clamping portions of each pair of arms at each end of the machine the saw-clamping bars 13 are supported. These bars are preferably longer than a saw-blade and are each formed slightly concave on their opposing faces, so that they will contact with the saw-blade only at near their upper and lower edges, and in order to prevent the bars from splitting horizontally while in the act of clamping the saw they are each provided at intervals with vertical pins 14, which extend through them from their upper to their lower edges. Near each of its ends one of the bars is provided on its inner face with a laterally-projecting pin 15, which is designed to fit closely but smoothly into a registering hole in the face of the other bar. Thus as the bars are moved apart or forced together their horizontal edges will always be on the same plane and never one above the other.

Upon the outer face or side of each clamping-bar and a suitable distance from their top edges are secured metal angle-bars 16, which extend a suitable distance beyond each end of the clamping-bars. The vertical member of each angle-bar is secured to one of the clamp-bars 13, while their horizontal members rest upon the clamping portions 12 of the clamp-arms, and thus support the saw-clamp. Upon the horizontal face of one of the angle-bars 16 is adjustably secured what I term a "spacer-bar" or "spacer" 17. This spacer on each of its edges is provided with notches 18 and 19, the notch 18 being a greater distance apart than the notch 19 and each edge being so notched from one end to the other. The spacer is secured to the angle-bar at each end by a screw 20, which passes through the spacer and into a lug 21 on one arm of a yoke 22, the said lug passing up through a slot $21^A$ in the angle-bar 16. The yoke straddles the end of the angle-bar, and its other arm is shorter and extends a suitable distance over the upper face of the end of the angle-bar. (See Figs. 7 and 8.) A thumb-screw 23 passes through a threaded hole in the bend of the yoke and contacts with the end of the angle-bar, and as the same arrangement is employed at each end of the machine it will be seen that by screwing one thumb-screw 23 and unscrewing the other simultaneously the spacer may be adjusted either forward or backward a desired distance, the slots $21^A$ permitting the yoke 22 to be moved the desired distance.

The notches in the edges of the spacers are cut to conform to saw-teeth of standard gage, and in practice a plurality of the spacers may be employed one at a time with each machine, and the particular function they serve and the object of adjusting them will be hereinafter fully set forth.

Secured upon the angle-bars 16 so as to have a sliding movement thereon is a file-holder carriage 24, comprising a pair of substantially semicircular plates 25 and $25^A$, which are located one on either side of the machine and are so connected as to move in unison. Each plate is provided with a semicircular slot 26 and at each end with vertical posts or uprights 27 and $27^A$, respectively, having heads 28, provided with holes which are at right angles to the direction of the angle-bars. A short rod 29 is passed through the heads 28 at each end of the plates, and these rods are held within the heads by set-screws 30, which enter threaded holes in the heads and bear upon the rods. By this construction the two plates 25 and $25^A$ are securely connected and will move in unison, as will be further explained. The posts or uprights 27 on the plate 25 are provided on their inner edges with substantially V-shaped notches 31, in which the edge of one of the angle-bars 16 is designed to enter, while the inner edges of the posts $27^A$ are cut away, so as to form a shoulder 32, which rests upon the other angle-bar. Thus the notches 31 and the shoulders 32 support the carriage 24 upon the angle-bars 16, so that the semicircular plates 25 and $25^A$, of which it is made up, will lie below the edges of the angle-bars, while the rods 29, which connect the posts 27 and $27^A$, will lie a suitable distance above the angle-bars. It is necessary that the posts which support the carriage shall have a sliding movement upon the angle-bars and at the same time engage them frictionally, so that a certain amount of force will be required to accomplish the movement. I therefore provide for accomplishing this frictional engagement between the posts and the angle-bars in the following manner:

Each post $27^A$ is provided at its lower end with a hole $27^B$ at right angles to the angle-bars, and in each hole is inserted one end of an arm or bracket 33, the said arms being adjustably secured within the holes by set-screws 34. The outer ends of the arms are formed into upright members 35, the ends of which are bifurcated, and in this bifurcated end of each upright is pivoted one end of an arm 36, its opposite end passing inward through a slot 37 in the post $27^a$. The under side of the inner ends of these arms are formed with downwardly-extending members 38, having inclined faces which are designed to lie beneath and contact with the under side of the angle-bar, while their adjacent inner ends are bifurcated and have pivoted within the bifurcations the lower ends of threaded rods 39, which extend up through holes in the rods 29 and are provided with thumb-screws 40 at their upper ends, expansion-springs 41 being interposed between the thumb-screws and the rods 29. Thus when it is desired to lock the carriage frictionally upon the angle-bars, so that a certain amount of force will be required to slide the same, it is only necessary to screw down the thumb-screws 40 on the rods 39, and this will cause the upper faces of the notches 31 in post 27 and the shoulders 32 of posts 27$^A$ to contact with the angle-bars 16, while the members 38 of the arms 36 will at the same time be caused to contact with the under face of the angle-bar, and the expansion-springs 41 will prevent the carriage being locked tight enough upon the angle-bars to bind thereon, though all slack movement of the same will be obviated.

As previously stated, each of the semicircular plates 25 and 25$^A$, constituting the carriage, is provided with a concentric semicircular slot 26, and in each of these slots is designed to be adjustably secured a pair of sockets 42, which are of the form shown most clearly in Figs. 6 and 11. These sockets support guides 43, in which a file-holder, to be presently described, is reciprocated. Each socket 42 is provided with an axial bore 44, which extends from the top to within a short distance of the bottom, and a threaded hole 45 extends from the bottom of the bore to the bottom of the socket and is provided with a thumb-screw 46. A second threaded hole intersects the hole 45 at right angles and is provided with a set-screw 47, by which the thumb-screw 46 may be rigidly held in any position to which it has been screwed. The upper half of the socket is slightly reduced in diameter, thus forming a shoulder 48, and the reduced portion is threaded, though the threads are obliterated on diametrically opposite sides, leaving the sides flat, as shown at 49 in Fig. 11. These flattened sides permit the threaded end of the socket to be passed up through the slots 26 in the plates 25 and 25$^A$, as shown in Fig. 6, and to fit loosely therein, though they are prevented from turning. Before the threaded ends of the socket are passed up through the slots 26 a pair of wedge-shaped washers 50 are placed over the threaded ends so as to rest upon the shoulders 48, and after the ends are passed through the slots a similar pair of washers 50$^A$ is placed upon them so as to rest upon the plates 25 and 25$^A$. Ordinary washers 51 are then placed upon the wedged washers 50$^A$, and a nut 52 is screwed upon the threaded end of the socket against the washer 51, and in this manner the sockets are secured at any desired point in the slots 26. The wedge-shaped washers are each provided with a short handle 53, by which they may be turned, and by turning these wedge-shaped washers one upon the other both above and below the slots 26 by means of their handles the sockets are canted or tilted to stand at a slight angle to a perpendicular line in any direction desired, and when the nuts 52 are screwed down tightly upon the washers 51 the sockets will be rigidly held at the desired angle.

The file-holder guides 43, which are supported in the sockets, comprise forked members 54 and stems 55, which stems fit into the bores 44 of the sockets and rest upon the end of the thumb-screw 46, by means of which the guides may be adjusted vertically, as may be required. Threaded holes 56 are formed in the sides of the sockets, in which thumb-screws 57 are placed, and by means of these thumb-screws the guides may be securely held in the position to which they have been adjusted, or, in other words, will be prevented either from turning or jumping up. The forked portions of the guides are inclined slightly to one side of a vertical line, as shown in Fig. 6, in order to give the proper inclination to the file-holder, as will presently more fully appear.

The file-holder consists of a metal bar 58, which in cross-section is substantially of the form of an I-beam, the web being of skeleton form in order to secure lightness. Suitable handles 59 and 60 are secured to the ends of the bar, and stop-pins 61 project laterally from the bottom edge of each end of the bar to limit the backward and forward movement of the holder in filing. The file 62 is secured upon the bottom edge of holder 58 in the following manner: Holes 62$^A$ are formed in the bottom edge of the bar or holder 58, and in these holes are movably fitted short posts 63, which have threaded bores 64 extending nearly to their bottoms, and near their bottoms the posts are provided with holes 65 at right angles to the bores 64 and which are preferably triangular in shape. The upper edge of the holder 58 is provided with threaded holes 66, which are in axial alinement with the holes 62$^A$, and thumb-screws 67 are placed in these holes and extend down and into the threaded bores 64 of the posts 63, expansion-springs 68 being interposed between the head of the screws and the top of the holder. In securing the file to the holder a post 63 is first slipped upon each end of the file, the ends of the file passing through the triangular-shaped holes 65, and the posts are then passed up into the holes 62$^A$ in the bottom edge of the holder. The thumb-screws 67 are then screwed into the bores of the posts, and in this manner the file is securely clamped to the bottom edge of the holder. The steel from which files are constructed is very brittle, and consequently in clamping a file to the holder the said file might easily be broken; but by the use of the springs 68 a yielding pressure is exerted upon the ends of the file while it is being clamped and when it is ready for use, and while by clamping the file in this manner it is not liable to be broken it is nevertheless held firmly and immovably against the bottom of the holder.

The top edge of the holder has formed thereon a pair of upwardly-extending webs 69, which are of the same height, and between them a slightly-raised flat surface 70. The webs 69 are of such a distance apart that when the holder is turned upside down and placed across the machine at right angles to the angle-bars 16 the said webs will rest squarely upon the angle-bars, and the raised surface 70 will then form a gage by which the saw may be set so that its teeth will be exactly parallel or on a horizontal plane parallel with the angle-bars 16.

The holder in its reverse position is first placed at one end of the machine, and the saw is moved up or down until the teeth at that end just touch the raised portion 70. The holder is then placed across the other end of the machine and the saw moved as before, and when the saw has been firmly clamped it will then be ready for filing, or in a position parallel with the faces of the angle-bars upon which file-holder carriage is moved.

The mechanism for moving the carriage step by step is most clearly shown in Figs. 4 and 5 and is as follows: Upon the rear horizontal rod 29, which connects the rear posts 27 and 27$^A$ of the plates 25 and 25$^A$, constituting the carriage, is pivoted a hand-lever 71 in such a manner as to have a rocking movement upon the rod. The lever comprises a handle proper, to the under side of the forward end of which is suitably secured a metal plate 72, which extends forward a suitable distance beyond the handle and is provided with a vertical slot 73 near its extremity. Near the rear end of this plate is formed a downwardly-projecting stem 74, the lower end of which is bifurcated, and adjacent to where the stem joins the plate a pair of parallel ears 75 are formed, having alined holes through which the rod 29 passes and supports the lever, so that it may be rocked thereon. Between the ears 75 and rigidly secured upon the rods 29 by a set-screw 76 is a depending guide 77, the lower end of which is bifurcated, as shown at 78, Fig. 5, and extends to within a short distance of the spacer-bar 17. In the lower bifurcated end of the stem 74 is pivoted the rear end of a dog 79, the forward end of which extends through the bifurcated end of the guide 77 and is provided on its under side with a tooth 80, which is designed to engage the notches in the spacer in operating the carriage. The dog 79 is held normally down, so as its tooth shall engage the notches in the spacer, by a spring 81, the ends of which encircle the rod 29, one on each side of the lever, and are suitably secured to the said rod, while the remaining portion of the spring is formed into a yoke which rests upon the top of the dogs, as shown in Fig. 4, and holds it down, as before stated. Upon the opposite rod 29 and in line with the dogs 79 is pivotally supported what I term the "file-holder lifter" 82. This device is simply a rod or bar one end of which is formed into a head having a hole through which the rod 29 passes, and from its pivotal or swinging end it curves down until its under edge rests upon the spacer, and its opposite or free end terminates just beneath the forward end of the plate 72 of the lever 71 and in line with its slot 73. This end of the file-lifter is bifurcated, and an upwardly-extended threaded rod 83 is pivoted therein. The free end extends up through the slot 73 in the plate 72 and is provided with a thumb-screw 84. Adjacent to the bifurcated end of this lifter and from the under side thereof projects a stop-pin 85, which is designed to enter the notches in the spacer as the carriage is moved forward and to limit its movement to a predetermined distance at each rock of the hand-lever 71. The file-lifter is normally held down so that its pin shall engage a notch in the spacer by a spring 86, which is a counterpart of the springs 81 on the opposite rod 29.

In filing crosscut-saws each alternate tooth is filed at one horizontal angle, and the carriage is then slid back and the holder set at an opposite horizontal angle, the file being adjusted horizontally by slightly moving the spacer-bar 17, whose notches determine the step-by-step movement of the carriage, and consequently of the file, so that when the operation is begun again the file shall take each alternate tooth between those files at the first operation. Hence it will be seen that the carriage must move a distance of one notch of the spacer at each operation of the hand-lever. The carriage is moved and stopped in the following manner: When the lever 71 is pressed down, as shown in the dotted line, Fig. 4, the dog 79 will be moved forward more than the distance of one notch, and at the same time the file-lifter will be raised. As the lever is lifted the dog will be moved back slightly, and its tooth will engage the notch of the spacer in advance of the one it previously engaged, and the lifter will descend until its pin will first contact with the spacer just rear of the notch it is intended to engage, when a further movement of the lever will cause the pin to engage or slip into the notch, and thus stop the carriage just one notch in advance of the position it previously occupied. The notches in the spacer are cut to conform to saws of standard gage. Therefore the space between these different sets of notches will vary considerably, and so by properly manipulating the thumb-screw 84 the pin in the lifter will always strike upon the spacer just rear of the notch it is intended to engage.

The operation of my improved saw-filing machine is as follows: The saw-blade is placed between the clamp-bars 13 and slightly clamped. It is then adjusted by the gages on the upper edge of the file-holder 58, so that its edge shall be exactly parallel or on a horizontal plane parallel with the top surfaces of the angle-bar 16, upon which the carriage moves, and the blade is then tightly clamped by turning the thumb-screws 10 of the clamp-arms, by which the said arms are caused to come together against the clamp-bars and press them firmly together. The guides for the file-holder are then set at the desired horizontal and vertical angles and the thumb-screws 40 turned to cause the carriage to engage its supporting angle-bars, so as to be held frictionally thereon as tightly as may be desired. The filing is then begun by reciprocating the file-holder, and as each tooth is filed the hand-lever 71 is rocked, which action simultaneously moves the carriage a predetermined distance and brings it to a stop and lifts the file and its holder out of engagement with the tooth just filed and places it in position for the next tooth. When the carriage has reached the farther end of the saw, the hand-lever is moved to the position shown in Fig. 5 and the dog 79 raised out of engagement with the notches in the spacer, when the spring 81 will rest upon the forward end of the guide 77 and lie behind an inclined shoulder 79$^A$ on the upper edge of the dog and cease to exert a downward pressure upon the dog and at the same time hold it in an elevated position. The thumb-screws 40 are then turned so that the carriage may move loosely upon its supports, and it is then slid back to the opposite end of the machine in position for beginning its previous operation. The grooves 54$^A$ in the bottoms of the forked portions of the supports permit the lower ends of the posts to pass as the holder is reciprocated, and the angled shoulders 54$^B$ support the bottom of the holder 58 and limit the file to a uniform depth of cut throughout the operation.

My machine is adapted both for filing dull saws of any standard gage or for filing original teeth in a blade. When a saw is to be sharpened, it is difficult to clamp it so that its teeth shall exactly coincide with the notches in the spacer, and in order to meet this difficulty the spacer is adjustably secured upon the angle-bar, as previously described, and by properly manipulating the screw 23 in the yokes 22, which are attached to each end of the spacer, the said spacer may be adjusted longitudinally so that its notches may exactly coincide with the teeth in the saw after the same has been clamped in the machine.

Having thus described my invention, what I claim as new, and desire to secure by Letters Patent, is—

1. In a saw-filing machine, the combination with the standard having clamping-arms secured thereto, of horizontal clamping-bars having tracks upon their sides supported between the said arms, a carriage having a step-by-step movement on the tracks; sockets secured to the carriage so as to be horizontally and obliquely adjusted; guides vertically adjustable in said sockets and a file-holder supported in the guides, substantially as shown.

2. In a saw-filing machine, the combination with a pair of saw-clamps having tracks upon their sides, of a carriage having a step-by-step movement on said tracks, said carriage comprising a pair of substantially semicircular plates which are connected so as to move in unison, and each plate having a concentric semicircular slot; horizontally and obliquely adjustable sockets secured within the slots; vertically-adjustable obliquely-disposed guides in said sockets; a file-holder supported in said guides, and means for supporting and clamping the saw-guides, substantially as shown.

3. In a saw-filing machine, the combination with a pair of saw-clamps having tracks upon their sides, of a carriage supported upon said tracks, said carriage comprising a pair of substantially semicircular plates, each having a post at its extremities and a concentric semicircular slot, the posts on one plate having notches which engage the adjacent track while those on the other plate have shoulders which rest upon the track; rods which pass through the upper ends of the posts so as to unite the plates and means for securing them therein; horizontally and vertically adjustable guides secured within the semicircular slots; a file-holder supported in said guides, a tension device for maintaining frictional contact between the carriage and tracks whereby said carriage is adjustably clamped to said track; means carried by the carriage and tracks for imparting a step-by-step movement to the carriage and means for supporting and clamping the saw-clamps, substantially as shown.

4. In a saw-filing machine, the combination with a saw-holder having tracks on its sides, of a carriage mounted on said tracks, comprising two substantially semicircular plates, each having a concentric semicircular slot; posts at the extremities of one plate having notches which engage one of the tracks; similar posts on the other plate having shoulders which rest upon the opposite track and a rod for connecting the posts at each end of the plate and above the tracks; arms pivoted to the shouldered posts, having inclined projections which lie beneath the edge of the track, threaded rods pivotally secured to their free ends which pass up through holes in the rods, connecting the plates, and are provided with thumb-screws and a spring interposed between the thumb-screw and connecting-rod, whereby said shoulder and inclined projections are caused to clamp said track, adjustable guides carried by the carriage, and means for imparting a step-by-step movement to the said carriage, substantially as shown.

5. In a saw-filing machine, the combination with the saw-holder having tracks thereon, and a carriage having semicircular slots, one on each side of the track, of sockets having reduced threaded ends flattened on diametrically opposite sides and shoulders formed by the reduced ends, the said reduced ends extending up through the slots in the carriage; wedge-shaped washers interposed between the shoulders and the under side of the carriage; similar washers placed upon the extended reduced end so as to rest upon the carriage; an ordinary washer placed upon the last-mentioned wedge-shaped washer and a nut screwed upon the end of the socket and down upon the top washer; a thumb-screw in the bottom of the socket and an engaging set-screw at right angles thereto; guides having depending stems which fit into the sockets and rest upon the thumb-screws, and thumb-screws extending through the sides of the sockets so as to engage the stem of the guides, substantially as shown.

6. In a saw-filing machine, the combination with a saw-holder having tracks thereon, of a notched spacer adjustably secured to one of the tracks, yokes at each end of the tracks, screws which pass through slots in the track and into one arm of the yoke and thumb-screws which pass through threaded holes in the bend of the yoke and engage the end of the track; one arm of the yoke lying beneath the track, while the other arm rests upon the top of the tracks, substantially as shown.

7. In a saw-filing machine, the combination with a saw-holder having tracks thereon, a notched spacer-bar adjustably secured to the tracks and a carriage mounted upon the tracks having variably-adjustable guides secured thereto, which support a file-holder; of mechanism for moving the said carriage step by step, comprising a hand-lever which is pivotally mounted at one end of the carriage and having a depending arm, the end of which is adjacent to the spacer; a spring-actuated dog pivoted at its rear end to said arm having a tooth at its forward end, which engages the notches in the spacer and an inclined shoulder on its upper edge, a guide for the forward end of said dog, a spring-actuated arm pivoted at the opposite end of the carriage so as to lie beneath the file-holder, the forward end of which is adjustably connected to the hand-lever and is provided with a stop-pin, which engages the notches in the spacer, the said arm being designed to be lifted by the hand-lever so as to simultaneously disengage its stop-pin from the notch in the spacer and lift the file-holder vertically, substantially as shown.

8. In a saw-filing machine, the combination with a saw-holder having tracks thereon, of a carriage mounted on said tracks comprising two connected plates which lie one on each side of the tracks and are each provided with a horizontally-disposed semicircular slot, sockets having reduced ends which are extended up through said semicircular slots; wedge-shape washers on the sockets above and below the slots; adjusting-screws in the bottoms of the sockets and inclined guides having stems which fit into the sockets and rest upon the adjusting-screws; the said guides by reason of the sockets, the slots, the wedge-shape washers and the adjusting-screws, being capable of adjustment horizontally, vertically and at an incline to a vertical line, substantially as shown.

In testimony whereof I affix my signature in presence of two witnesses.

NICOLAUS KALL.

Witnesses:
G. SARGENT ELLIOTT,
BESSIE THOMPSON.